United States Patent

[11] 3,628,182

[72] Inventors: Arthur Ashkin
Rumson;
John E. Bjorkholm, Middletown, both of N.J.
[21] Appl. No. 808,768
[22] Filed Mar. 20, 1969
[45] Patented Dec. 14, 1971
[73] Assignee: Bell Telephone Laboratories, Incorporated
Murray Hill, N.J.
Continuation-in-part of application Ser. No. 736,690, June 13, 1968, now abandoned.
This application Mar. 20, 1969, Ser. No. 808,768

[54] RING-TYPE PARAMETRIC OSCILLATOR
11 Claims, 3 Drawing Figs.
[52] U.S. Cl................................................ 331/96,
307/88.3, 331/107 R, 333/83 R
[51] Int. Cl................................................ H03f 7/00
[50] Field of Search.......................................... 307/88.3;
330/4.5; 331/74, 96, 107 R

[56] References Cited
UNITED STATES PATENTS
3,174,044  3/1965  Tien ............................ 307/88.3
3,267,385  8/1966  Ashkin ........................ 307/88.3

Primary Examiner—Roy Lake
Assistant Examiner—Darwin R. Hostetter
Attorneys—R. J. Guenther and Arthur J. Torsiglieri ABSTRACT: In the parametric oscillators disclosed, first and second ring resonators are disposed to pass pumping radiation in one direction only and are characterized by a common region in which the nonlinear optical medium is disposed. The first and second ring resonators are separately tunable to resonate the signal and idler, respectively.

Patented Dec. 14, 1971 3,628,182

INVENTORS  A. ASHKIN
J. E. BJORKHOLM
BY
Arthur J. Torsiglieri
ATTORNEY

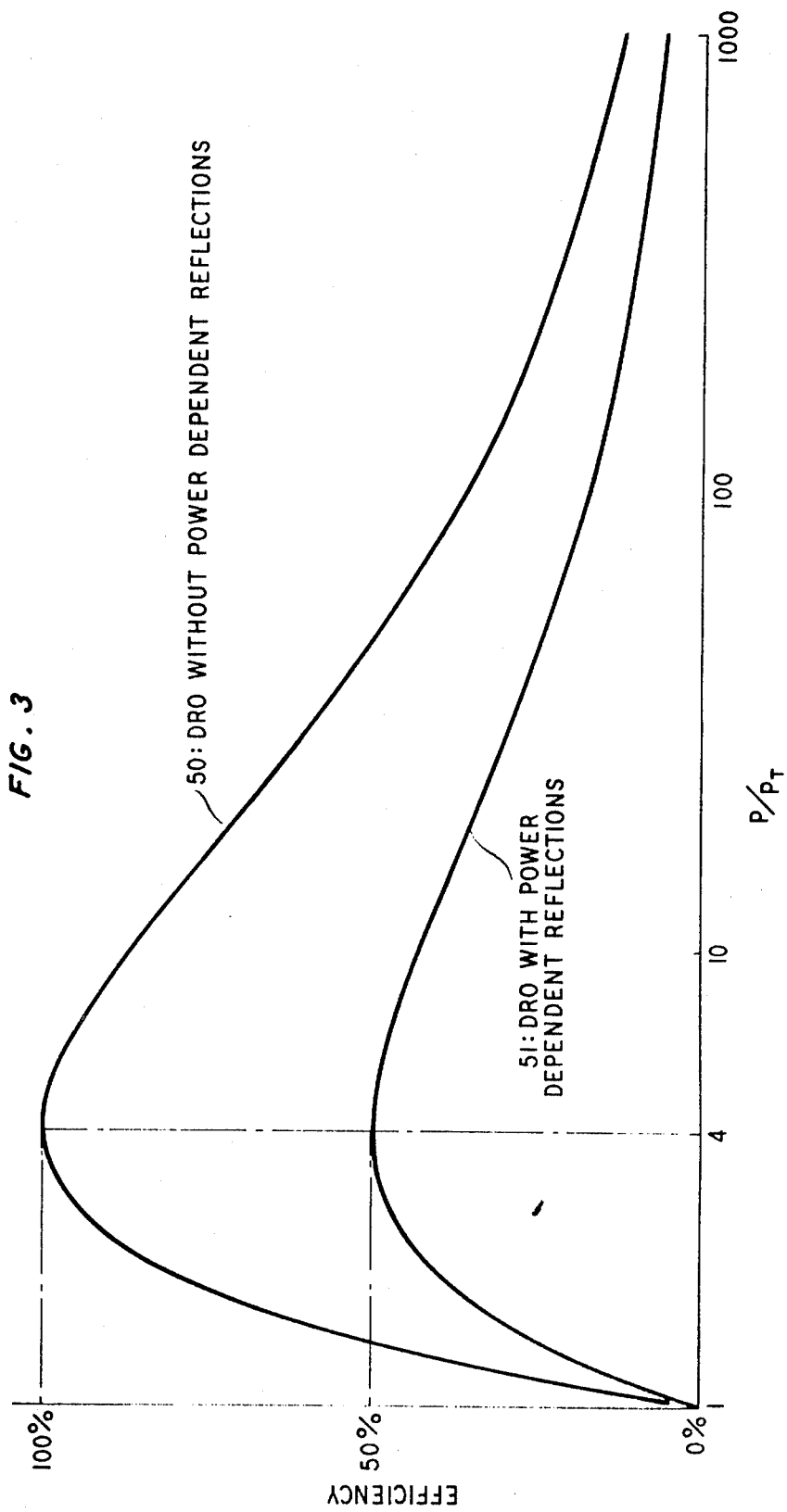

RING-TYPE PARAMETRIC OSCILLATOR

This application is a continuation-in-part of application Ser. No. 736,690 filed June 13, 1968 now abandoned and relates to optical parametric devices such as optical parametric oscillators.

BACKGROUND OF THE INVENTION

For purposes of this invention, the optical region of the spectrum will be assumed to include millimeter, submillimeter, infrared, visible, and ultraviolet radiation. The wavelengths of these radiations decrease in the order given.

Parametric devices include a material in which a distributed nonlinear interaction between radiations of differing frequency provides energy transfer between the radiations. In a useful parametric device, the energy transfer typically is from a supplied pumping radiation to so-called signal and idler radiations. The distributed interaction typically occurs through the bulk of the material and does not involve discrete energy levels.

Such devices are expected to be useful in the future, especially for communication and other uses in which tunable sources are desirable, because their lack of discrete-energy-level resonance theoretically permits very broad tunability.

A significant problem associated with prior art parametric oscillators is power-dependent reflections, also termed induced reflections, of pumping radiation. See, "Nonlinear Optical Effects: An Optical Power Limiter," by A. E. Siegman, Applied Optics 6, 739 (1962). This reflection occurs in prior art oscillators in which both the signal and idler are made to be resonant (i.e., a doubly resonant oscillator or DRO) within a single cavity formed by a pair of parallel mirrors. Because the signal and idler travel through the nonlinear crystal under phase-matched conditions in the backward direction (due to reflection from the resonator mirrors) as well as the forward direction, backward-traveling signal and idler waves mix to generate a backward-traveling pump wave, which is equivalent to a reflection of pump radiation. The reflection is considered to be power-dependent inasmuch as the power of backward-traveling pump radiation increases as the incident pump power is increased, and is disadvantageous for at least two reasons: first, it produces an undesirable reaction of the parametric oscillator back upon the source of pump power necessitating the use of an isolator, and, secondly, it causes poor overall efficiency.

The efficiency of such doubly resonant parametric oscillators (DRO) with power-dependent reflections is best understood in the context of the power limiting which inherently occurs in the amount of pump power transmitted through the oscillator. More specifically, it is known that regardless of the input pump power above threshold, the pump power transmitted by the oscillator is limited or clamped to the threshold power level. The residual input power is partly converted into signal and idler and partly converted disadvantageously into the aforementioned backward-traveling pump wave. Maximum theoretical efficiency in a DRO with power-dependent reflections is 50 percent and is obtained when the input pump power is four times the threshold. Pumping harder only reduces the efficiency because the power-dependent reflections grow more rapidly, as $P/P_t$ (the ratio of input pump power to threshold power) is increased, than does the signal and idler power.

Moreover, the prior art has been plagued by the problem (termed the "cluster" effect) that tuning has been erratic and discontinuous because of the need to achieve simultaneous resonance of the signal and idler radiations in the doubly resonant cavities employed to obtain low oscillation threshold. That is, because the signal and idler resonators have heretofore not been independently tunable, it has not been possible to insure that both the signal and idler will be simultaneously resonant. For example, although the signal may be resonant, the idler may fall between adjacent modes.

We have recognized that it would be desirable to have optical parametric devices not subject to these liabilities. One solution previously proposed by us is the use of singly resonant oscillators. Nevertheless, the oscillation threshold for such an oscillator is much higher than that for an oscillator in which both signal and idler are resonant. We propose here such a resonant oscillator in which pump power reflections are eliminated and signal and idler resonators are separately tunable so that the tuning characteristics can be made continuous. One advantage of such an oscillator is that adequate output power levels may be realized with pumping power levels low enough to permit an extended lifetime for the nonlinear optical material.

SUMMARY OF THE INVENTION

In the doubly resonant parametric oscillator (DRO) of our invention, the induced reflection of the pumping radiation is avoided by resonating the signal and idler in a single ring resonator; and, in addition, both induced reflections and the cluster effect are reduced considerably by employing separately tunable signal and idler resonators, at least one of which is a ring resonator. These latter resonators have a common region in which the nonlinear optical medium is disposed and are adapted to pass the applied pumping radiation through the nonlinear optical medium in one direction only. They are separately tunable. A low oscillation threshold is obtained because both the signal and idler are resonated, and ready tunability of the oscillation is provided because the signal and idler resonators are separately tunable and hence independent. Therefore, each can be independently tuned for the desired resonance condition.

Because in the ring-type DRO of the present invention, the signal and idler always travel through the nonlinear crystal in the forward direction, no backward-traveling pump wave is induced. Consequently, power-dependent reflections are virtually eliminated and the limiting action of prior art devices is no longer present, i.e., the pump power transmitted by the oscillator is not clamped to the threshold power. Several advantageous properties result. First, elimination of the power-dependent reflections eliminates any reaction of the oscillator back on the source of pump radiation. Secondly, the oscillator more efficiently converts the pump radiation into signal and idler radiation. In fact, 100 percent efficiency theoretically occurs at finite power levels. More specifically, it occurs at $P/P_t$ equal to approximately 4, a feature not attainable in prior art DROs with power-dependent reflections.

It should be noted that power-dependent reflections can be eliminated not only in a ring-type DRO as in the present invention, but also in a singly resonant oscillator (SRO) as taught by applicants in copending application, Ser. No. 728,667 filed May 13, 1968, and assigned to applicants' assignee.

BRIEF DESCRIPTION OF THE DRAWING

Further features and advantages of our invention will become apparent from the following detailed description, taken together with the drawing, in which:

FIG. 3 is a graph of efficiency versus $P/P_t$ for DROs with and without power-dependent reflections.

DESCRIPTION OF ILLUSTRATIVE EMBODIMENTS

Figure 1:
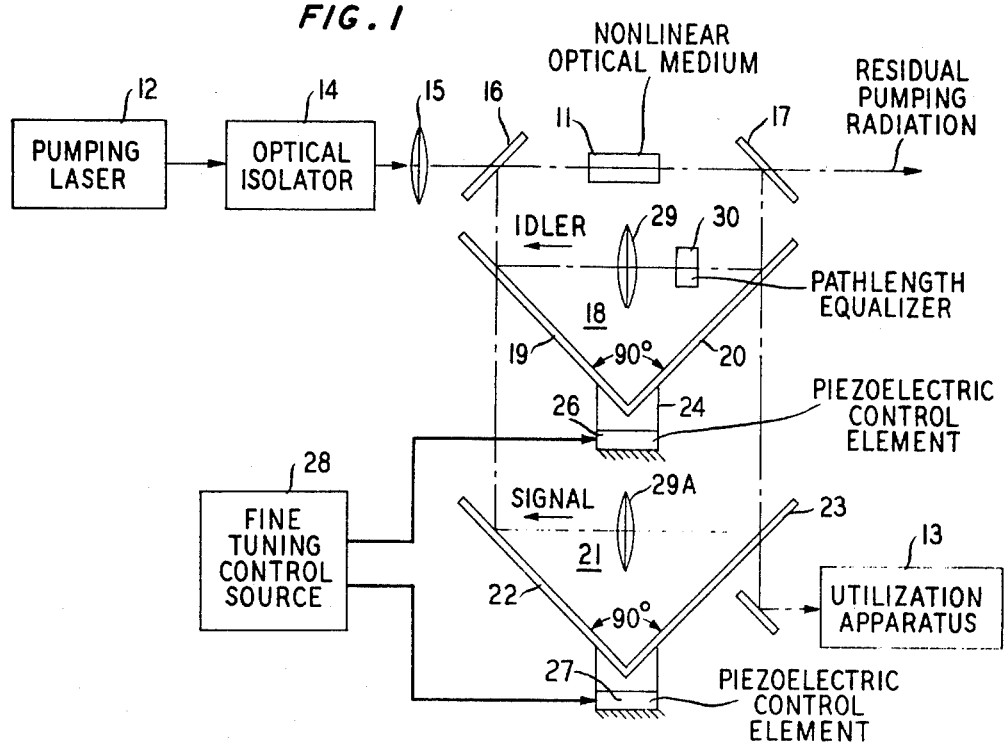
FIG. 1 is a partially pictorial and partially block diagrammatic illustration of a first embodiment of the invention.

In the embodiment of FIG. 1, parametric oscillation is to be achieved in a nonlinear optical medium 11 in response to coherent pumping radiation from a laser 12 in order to supply a coherent radiation of broadly and accurately tunable frequency to a utilization apparatus 13, in which such radiation is useful. Typically, the frequency of the laser 12 is not directly tunable in frequency over as broad a range as would be desired in, for example, a source of local oscillations for an optical heterodyne receiver 13 and the invention serves to provide an output more broadly tunable than the output of laser 12.

The coherent radiation from laser 12 is supplied to the nonlinear optical medium 11 through an optical isolator, 14, (more fully described below) a focusing lens 15 and a frequency-selective reflector 16 of the parametric oscillator.

After conversion of a portion of the pumping radiation into collinearly propagating signal and idler radiation in nonlinear optical medium 11, the residual pumping radiation is passed out of the parametric oscillator through frequency-selective reflector 17.

It might be noted that the advantages of our invention are not restricted solely to collinear interactions so long as phase-matching is maintained.

Reflectors 16 and 17 are obliquely oriented with respect to the radiation paths in the oscillator to avoid reflection of pumping radiation in the backward direction. To this end, the entrance and exit surface of medium 11 are preferably antireflection coated, and/or tilted with respect to the direction of the pumping radiation.

The embodiment shown includes a tunable idler ring resonator and a tunable signal ring resonator. The idler ring resonator comprises the reflectors 16 and 17 and the 90° rooftop reflector 18, including reflector elements 19 and 20, all arranged to form a closed ring-type path for the idler radiation. It further includes the lens 29 for focusing the idler radiation. It also includes the element 30 (described more fully below) for substantially equalizing the optical pathlengths of the signal and idler resonators. Reflector elements 19 and 20 are frequency selective, so that they are reflective in the idler frequency range and transmissive in the signal frequency range.

The signal ring resonator comprises the reflectors 16 and 17 and the 90° rooftop reflector 21, including reflector elements 22 and 23, all arranged to form a closed ring-type path for the signal radiation. It further includes the lens 29A for focusing the signal radiation. Reflector element 23 of the signal rooftop reflector 21 is partially transmissive at the signal frequency to pass a portion of the signal radiation to utilization apparatus 13.

Rooftop reflectors 18 and 21 are mounted for translational movement, to lengthen or shorten the respective resonator pathlengths, upon mounting blocks 24 and 25, respectively, which are in turn mounted on piezoelectric control elements 26 and 27, respectively. Piezoelectric control elements 26 and 27 are adapted to move rooftop reflectors 18 and 21 with respect to the reflectors 16 and 17. Piezoelectric elements 26 and 27 are driven in a coordinated manner by fine tuning control source 28 to make the signal and idler resonant mode frequencies track complementarily, so that they add to equal the pump frequency.

As described here, the embodiment shown offers versatility in tuning. Various modes of operation can be achieved by varying the relative lengths of the signal and idler resonators. We shall describe several of the various possible arrangements. First, the optical pathlengths of the two resonators can be made equal. The fine tuning is used to assure that there are signal and idler mode frequencies that add up to the pump frequency. In such a case, oscillation could then occur over a group of modes. Once this situation is achieved, the wavelength of the output oscillations can be changed (for example, by rotating the crystal) at will without the possibility of finding regions over which oscillations cannot occur. In other words, this particular scheme eliminates the "cluster effect" or discontinuous tuning. It might be noted that the signal and idler cavity optical pathlengths could also be made multiples of one another to achieve similar operation. Another possible arrangement is to deliberately make the signal and idler cavity optical pathlengths incommensurate so that only a very small fraction of the modes can be made to add up to the pump frequency at the same time. Such a scheme would be of use to force oscillation on a particular cavity mode. Once again, as the wavelength of the oscillation is changed, the piezoelectric ceramics can be used to continuously insure oscillation on the desired signal mode and its appropriate idler. As a modification of this scheme, the optical pathlength of the idler resonator could be chosen to be a multiple of the optical pathlength of the pumping laser. In this case, all the power of a multimode pump would be effective in driving a single signal mode because the appropriate idler modes have been provided.

The pumping laser 12 is illustratively a continuous-wave argon ion laser operation at 5,145 A, and may be built and operated as disclosed in the copending patent application of W. W. Rigrod, Ser. No. 627,493, filed Mar. 31, 1967 and assigned to the assignee hereof (now abandoned in favor of continuation-in-part application, Ser. No. 795,137 filed on Jan. 24, 1969). Pumping laser 12 could employ a broadband focusing end reflector in place of the mode-selective prism reflector of the above-cited patent application, if it is to be operated with a multimode output in the manner explained hereinafter.

The optical isolator 14 is optional. It comprises a 45° Faraday rotator, illustratively a glass containing major amounts (10–60 percent) of one or more of the rare earth ions praseodymium, terbium and dysprosium, ad disclosed in the copending patent application of S. B. Berger et al. Ser. No. 274,999, filed Apr. 23, 1963 and assigned to the assignee hereof (now U.S. Pat. No. 3,318,652 issued on May 9, 1967), subjected to an axial magnetic field and disposed between polarizers oriented relatively at 45° to pass the pumping radiation in the forward direction but to block any backscattered or back-reflected pumping radiation. Such scattering or reflections may occur from lens 15 or medium 11. Such an isolator is not required in embodiments of our invention employing reflectors such as filter reflectors 16 and 17.

Focusing lens 15 is illustratively selected to provide a waist, or minimum cross section, of the pumping beam in the middle of medium. Optionally, although not always preferably, the focusing may be optimized as disclosed in the copending patent application of Messrs. G. D. Boyd and D. A. Kleinman, Ser. No. 713,055 filed Mar. 14, 1968 and assigned to the assignee hereof (now U.S. Pat. No. 3,530,301 issued on Sept. 22, 1970.

The nonlinear optical medium 11 is illustratively barium sodium niobate ($Ba_2NaNb_5O_{15}$), as disclosed in the copending patent application of A. A. Ballman et al., Ser. No. 652,551, filed July 11, 1967 and assigned to the assignee hereof (now U.S. Pat. No. 3,423,686 issued on Jan. 21, 1969.

The frequency-selective reflectivity characteristics of reflectors 16, 17 and 18 may be achieved by multiple-dielectric coatings in a manner well known in the optical art. For this purpose, the idler wavelength range may be considered to extend from 1.029 $\mu$ to very long wavelengths into the far infrared and beyond; and the signal wavelength range extends from 5,145 A to 1.029$\mu$. Reflectors 16 and 17 are reflective throughout the combined signal and idler wavelength range.

Figure 2:
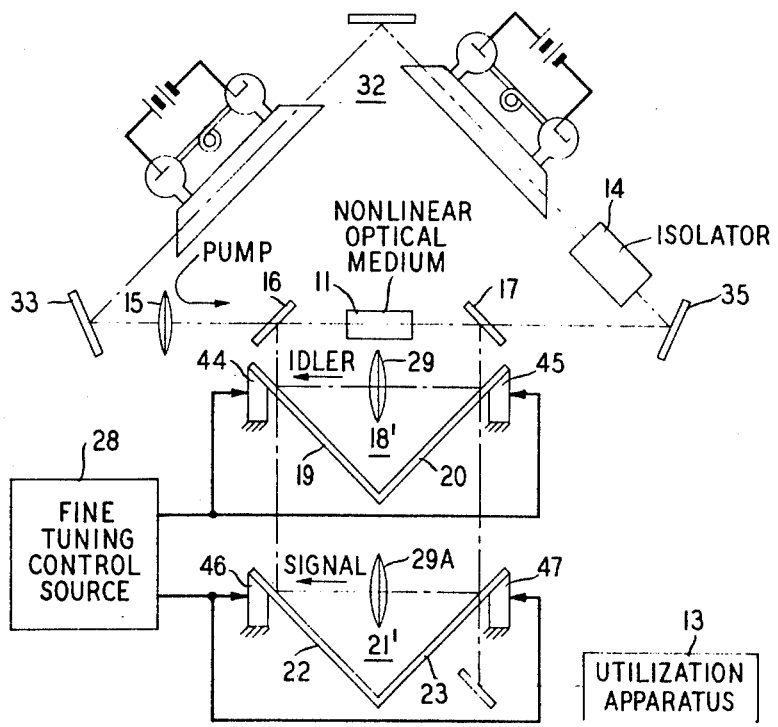
FIG. 2 is a modification of the embodiment of FIG. 1 for recirculation of unused pumping radiation.

Although the mounts 24 and 25 are shown at the vertices of rooftop reflectors 18 and 19, they could as well be mounted at the outer edges, as shown in FIG. 2. The alternate mounts facilitate making the signal and idler optical pathlengths to be exactly equal.

The optional optical pathlength equalizing element 30 is illustratively a body of antireflection-coated low-loss high index-of-refraction optical material. The geometrical pathlength difference can be held to less than a few centimeters.

Rooftop reflectors 18 and 21 have the desirable property that incidental tilting of them does not affect the tuning condition if their vertices are not moved translationally. This advantage results from their retroflective properties in the plane of the resonators. More generalized retroreflective properties could be obtained with corner cube reflectors in place of rooftop reflectors 18 and 19.

In the operation of the embodiment of FIG. 1, the 5,145 A pumping radiation is partially converted to signal and idler radiations in the nonlinear optical medium 11; and the residual pumping radiation passes out of the parametric oscillator through the frequency-selective reflector 17. No pumping radiation is permitted to circulate in the signal and idler resonators.

The signal and idler wavelengths are illustratively 1.000 $\mu$ and 1.029 $\mu$, respectively.

Fine tuning control source 28 is adapted to vary these wavelengths in opposite directions, so that $$(1/\lambda_s)+(1/\lambda_i)=(1/\lambda_p) \quad (1)$$

where $\lambda_p$ = 5,145 A and $\lambda_s$ and $\lambda_i$ are the signal and idler wavelengths, respectively. Thus, source 28 generally drives reflectors 18 and 21 in opposite senses by very minute amounts to accomplish continuous tuning.

The unidirectional propagation of all the radiations in nonlinear medium 11 provides efficient use of medium 11, efficient conversion of the pumping radiation to signal and idler without an induced reflection of the pumping radiation and lack of any other reaction upon pumping source by the parametric oscillator because neither the signal nor idler resonators are resonant at the pump frequency, and because no backward-traveling signal and idler waves occur in the medium 11 to create a backward-traveling pump wave, as previously discussed. This latter property exists in a DRO in which both signal and idler are resonant in a single ring resonator as well as in the embodiment of the invention employing a pair of ring resonators.

Optionally, medium 11 may be oriented with its optic axis orthogonal to the common direction of propagation of the radiations therethrough and temperature-tuned (by means not shown) to provide phase matching of pump signal and idler radiations. Alternative methods of coarse tuning are crystal rotation, application of electric field, application of pressure, and any other method that changes the refractive indices of the nonlinear crystal. For phase matching, $$(\lambda n_p/\lambda_p)=(n_s/\lambda_s)+(n_i/\lambda_i) \quad (2)$$

where $n_p$ is the index refraction for the pumping radiation, $n_s$ is the index of refraction for the signal radiation, and $n_i$ is the index of refraction for the idler radiation. Typically, one or both of the signal and idler radiations will be polarized in a direction orthogonal to that of the pumping radiation. Phase-matching techniques are now well known in the optical parametric oscillator art.

In addition, the arrangement of FIG. 1 provides unusual versatility in tuning of the parametric oscillator. Signal and idler fine tuning may be achieved by the complementary adjustments of the signal and idler ring resonator. These adjustments do not affect pumping laser 12 or any other pumping radiation resonance. Thus, if desired, the pumping source may be independently tuned. Moreover, recirculation of the residual pumping radiation or active resonating of it can be achieved without direct interaction with the signal and idler resonators, as illustrated in the embodiment of FIG. 2.

It may be noted that, if multimode pumping radiation is to be employed, the resonator of the laser 12 is provided with an optical pathlength equal to, or an integral submultiple of, that of either the signal or idler resonators, or of both of them if they are equal. With this adaptation, the full power capabilities of source 12 are utilized. Every pump mode efficiently drives a pair of signal and idler modes.

The embodiment of FIG. 1 is capable of tunable continuous-wave parametric oscillations.

Referring more particularly to embodiment of FIG. 2, one may see that the principal modification with respect to the embodiment of FIG. 1 is that the pumping laser 32 includes an optical ring resonator formed by the highly reflective opaque reflectors 33, 34 and 35. Although distorted because of space requirements in the drawing, the pump resonator preferably has an optical pathlength equal to, or an integral submultiple of, the optical pathlengths of the signal and idler resonators. Pumping radiation unconsumed in nonlinear optical medium 11 contributes to the buildup of the power level in pumping ring laser 32. The ring laser 32 also includes a pair of argon ion laser apparatuses including argon-filled tubes and the usual excitation apparatus. Unidirectional traveling wave propagation of the pumping radiation is provided by isolator 14, like that of FIG. 1.

The parametric oscillator resonators are like those of FIG. 1 except that piezoelectric tuning control elements 44, 45, 46 and 47 are mounted at the outer edges of reflective elements 19, 20, 22 and 23, respectively, to allow rooftop reflectors 18 and 21 to be brought nearer to each other.

In other respects the construction and operation of the embodiment of FIG. 2 is like that of FIG. 1.

In principle, only one of the signal and idler resonators need be a ring resonator in order to obtain the advantages of our invention that induced reflection of the pumping radiation is prevented, and that independent adjustments of signal and idler resonators are facilitated while the low threshold deriving from simultaneous resonance of signal and idler is obtained.

The embodiments of FIGS. 1 and 2 are, of course, highly useful in parametric oscillators utilizing pulsed or Q-switched lasers.

With such pump sources, the oscillator resonators are desirably kept short so that steady state oscillations will rapidly build up.

Because the crystal occupies a large fraction of such short resonators, large percentage differences in optical pathlength for signal and idler occur with tuning. This makes independent optical pathlength adjustments more important. Such adjustments may be made by gross movements of the rooftop reflectors (by means not shown).

The efficiency of operation of DROs with and without power-dependent reflections is shown in FIG. 3. The curves show the efficiency with which power is converted into signal and idler power as function of $P/P_t$, the ratio of input pump power to threshold pump power. A comparison of the curves 50 and 51 indicates that the efficiency of the DRO without power-dependent reflections of the present invention (curve 50) is theoretically twice the efficiency of the prior art DRO with power-dependent reflections (curve 51). In particular, whereas the prior art DRO attains maximum efficiency of 50 percent at $P/P_t$=4.00, the DRO of the present invention attains a maximum theoretical efficiency of 100 percent at $P/P_t$=4.00.

What is claimed is:

1. Apparatus for the generation of coherent radiation comprising in combination
    a nonlinear optical medium,
    means for applying pumping radiation to said medium for unidirectional propagation therethrough to generate therein signal and idler radiation,
    a ring resonator for resonating either said signal or idler radiation, but not both,
    a second resonator for resonating said signal or idler not resonated in said ring resonator, said second resonator having a common region with said ring resonator,
    said medium being disposed in said common region, and
    means for providing egress of radiation from at least one of said resonators.

2. Apparatus according to claim 1 in which the ratio of the power of the pumping radiation to the threshold power of said nonlinear medium is about 4.

3. Apparatus according to claim 1 in which said ring resonator and said second resonator are separately tunable.

4. Apparatus according to claim 3 in which the second resonator is a ring resonator.

5. Apparatus according to claim 4 in which the first and second ring resonators are formed in part by retroreflecting elements, said elements being translatable for tuning said resonators.

6. Apparatus according to claim 5 in which the retroreflecting elements are rooftop reflectors.

7. Apparatus for the generation of coherent radiation comprising a source of pumping radiation, signal and idler resonators characterized by a common region and adapted for unidirectional propagation of the pumping radiation in said common region, a nonlinear optical medium being disposed in said common region, at least one of said resonators being a ring resonator arranged to prevent induced reflection of said pumping radiation.

8. Apparatus according to claim 7 in which said signal and idler resonators are separately tunable.

9. Apparatus according to claim 7 in which both of the signal and idler resonators are ring resonators, the common region of said resonators being defined by obliquely oriented reflectors that are substantially totally transmissive for the pumping radiation and substantially totally reflective for the signal and idler radiations.

10. Apparatus according to claim 7 in which the signal and idler resonators include a pair of planar reflectors obliquely oriented with respect to the propagation directions of the signal and idler radiation, said obliquely oriented reflectors being substantially totally transmissive with respect to the pumping radiation.

11. Apparatus according to claim 7 in which the ratio of the power of the pumping radiation to the threshold power of said nonlinear medium is about 4.

* * * * *

UNITED STATES PATENT OFFICE
CERTIFICATE OF CORRECTION

Patent No. 3,628,182              Dated December 14, 1971

Inventor(s) Arthur Ashkin and John E. Bjorkholm

It is certified that error appears in the above-identified patent and that said Letters Patent are hereby corrected as shown below:

Column 4, line 18, change "ad" to --as--.
Column 4, line 37, 1970).
Column 4, line 42, 1969).

Column 5, line 5, Equation (1) "$(1/\lambda ...$" should be $--(1/\lambda_s)...--$.

Column 5, line 32, Equation (2) "$/\lambda n_p/...$" should be $--(n_p/...--$.

Signed and sealed this 4th day of July 1972.

(SEAL)
Attest:

EDWARD M. FLETCHER, JR.                ROBERT GOTTSCHALK
Attesting Officer                      Commissioner of Patents